(12) United States Patent
McDonald

(10) Patent No.: US 8,852,772 B2
(45) Date of Patent: Oct. 7, 2014

(54) LITHIUM ION BATTERY COOLING SYSTEM COMPRISING DIELECTRIC FLUID

(75) Inventor: Stephen S. McDonald, Hartland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 377 days.

(21) Appl. No.: 13/296,632

(22) Filed: Nov. 15, 2011

(65) Prior Publication Data

US 2013/0122331 A1     May 16, 2013

(51) Int. Cl.
| | |
|---|---|
| H01M 10/02 | (2006.01) |
| H01M 10/04 | (2006.01) |
| H01M 10/50 | (2006.01) |
| B60K 1/00 | (2006.01) |
| B60K 11/02 | (2006.01) |
| H01M 10/0525 | (2010.01) |
| H01M 10/60 | (2014.01) |
| B60L 11/18 | (2006.01) |

(52) U.S. Cl.
CPC .............. *B60L 11/18* (2013.01); *Y02T 10/7011* (2013.01); *H01M 10/0525* (2013.01); *H01M 10/50* (2013.01); *B60L 11/1874* (2013.01); *Y02T 10/7005* (2013.01); *Y02T 10/705* (2013.01)
USPC ................. 429/72; 429/50; 429/90; 429/120; 429/163; 180/65.1; 180/65.21; 123/41

(58) Field of Classification Search
USPC ...................... 429/56, 120, 5, 72, 90, 163, 50; 320/104; 180/65.28, 68.1, 65.1, 65.21; 123/41

See application file for complete search history.

(56) References Cited

U.S. PATENT DOCUMENTS

| | | | | |
|---|---|---|---|---|
| 4,007,315 | A * | 2/1977 | Brinkmann et al. | ............ 429/62 |
| 2001/0008723 | A1* | 7/2001 | Kawakami et al. | ............. 429/49 |
| 2004/0137313 | A1* | 7/2004 | Jaura et al. | ...................... 429/62 |
| 2006/0001399 | A1* | 1/2006 | Salasoo et al. | ................ 320/104 |
| 2009/0068547 | A1* | 3/2009 | Ambrosio et al. | .............. 429/50 |
| 2009/0142653 | A1* | 6/2009 | Okada et al. | ................... 429/120 |
| 2009/0249807 | A1* | 10/2009 | Nemesh et al. | ................. 62/117 |
| 2009/0253026 | A1* | 10/2009 | Gaben | ............................ 429/56 |

OTHER PUBLICATIONS

Cooling and Preheating of Batteries in Hybrid Electric Vehicles:, Ahmad Pesaran, The 6th ASME-JSME Thermal Engineering Joint Conference, Mar. 16-20, 2003, p. 1-7. Retrieved online on Mar. 18, 2013 from: http://www.nrel.gov/vehiclesandfuels/energystorage/pdfs/jte_2003-633_sw_ap.pdf.*

(Continued)

*Primary Examiner* — Kenneth Douyette
(74) *Attorney, Agent, or Firm* — Fraser Clemens Martin & Miller LLC; J. Douglas Miller

(57) ABSTRACT

A Lithium Ion battery cooling system for use in a hybrid vehicle comprises a plurality of self-contained liquid cooling modules, each cooling module including a closed and sealed container having an interior space. Each cooling module includes a battery assembly disposed within the interior space of the container and a plurality of battery cells having at least one fluid channel formed therebetween for receiving a fluid therein. A dielectric fluid is disposed within the at least one fluid channel. The dielectric fluid substantially immerses and is in contact with the battery assembly to heat and cool the battery assembly. A heating element is disposed within the interior space and heats the dielectric fluid. A cooling element is disposed within the interior space and cools the dielectric fluid.

20 Claims, 2 Drawing Sheets

(56) References Cited

OTHER PUBLICATIONS

Figure 1:
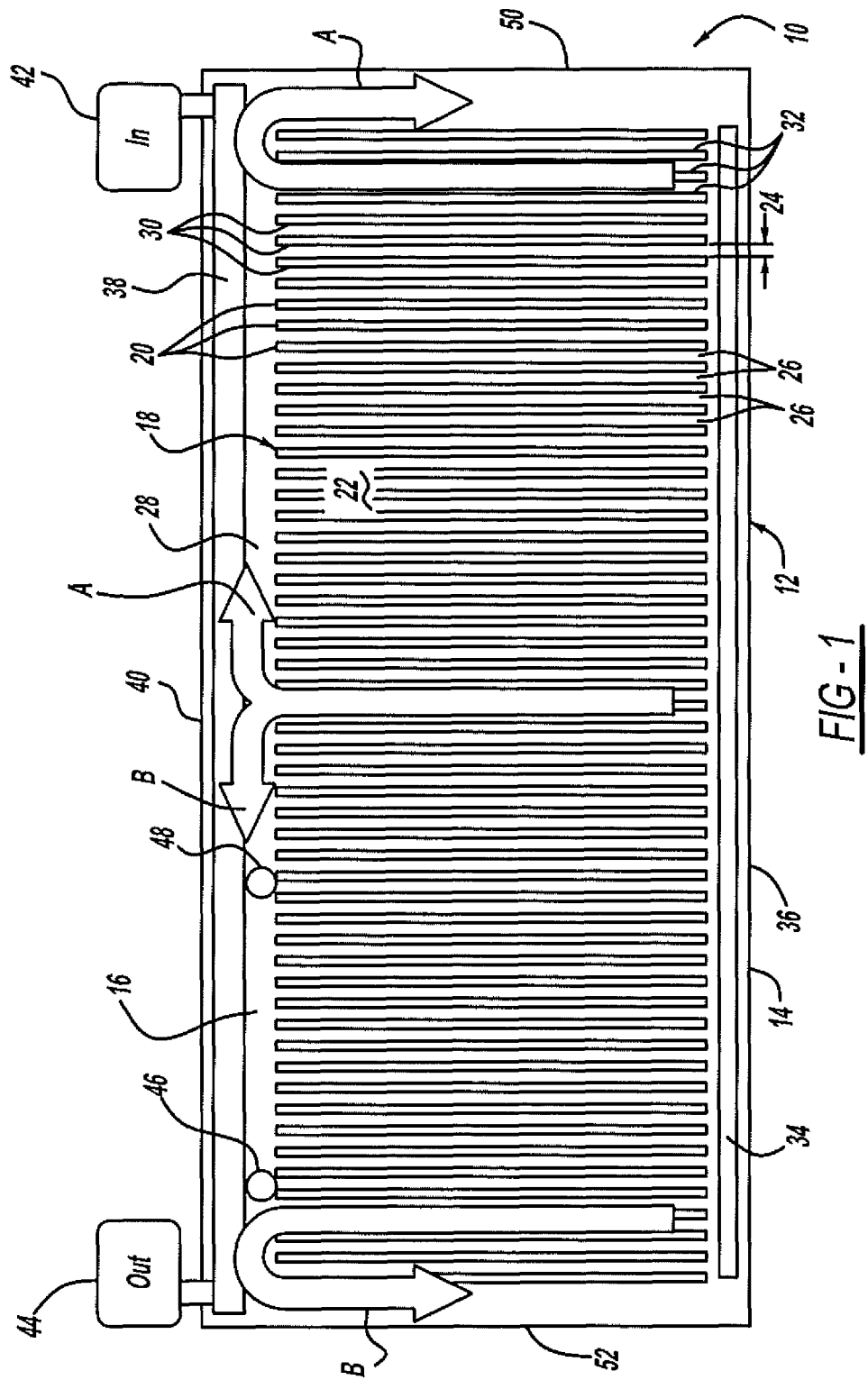

"For Electric Car Batteries, Managing Hot and Cold Is Just Right", Richard Cooke, Matternetwork.com, Sep. 9, 2010. Retrieved online on Mar. 19, 2013 from: http://www.matternetwork.com/2010/9/electric-car-batteries-managing-hot.cfm.*

"Ford Uses Innovative Liquid-Cooled Battery System to Help Focus Electric Owners Maximize Range", Ford Motor Company Publication, Sep. 2, 2010. Retrieved online on Mar. 19, 2013 from: http://media.ford.com/article_display.cfm?article_id=33185.*

"Second Law Analysis of a Liquid Cooled Battery Thermal Management System for Hybrid and Electric Vehicles", Lokendra Ramotar, Thesis p. 16-18, University of Ontario Institute of Technology, Aug. 2010. Retrieved online on Mar. 19, 2013 from: https://ir.library.dc-uoit.ca/bitstream/10155/111/1/Ramotar_Lokendra.pdf.*

Ramotar, Lokendra, Second Law Analysis of a Liquid Cooled Battery Thermal Management System for Hybrid and Electric Vehicles, University of Ontario Institute of Technology, Aug. 2010, pp. 16-18.

\* cited by examiner

LITHIUM ION BATTERY COOLING SYSTEM COMPRISING DIELECTRIC FLUID

FIELD OF THE INVENTION

The present disclosure relates to a vehicle battery pack with a self-contained liquid cooling system.

BACKGROUND OF THE DISCLOSURE

A battery cell has been proposed as a clean, efficient and environmentally responsible power source for electric vehicles and various other applications. One type of battery cell is known as the lithium-ion battery. The lithium-ion battery is rechargeable and can be formed into a wide variety of shapes and sizes so as to efficiently fill available space in electric vehicles. For example, the battery cell may be prismatic in shape to facilitate a stacking of the battery cells. A plurality of individual battery cells can be provided in a battery pack to provide an amount of power sufficient to operate electric vehicles.

Typical prismatic battery cells have a pair of plastic coated metal layers fused around a periphery of the battery cell in order to seal the battery cell components. The sealing of the battery cells generally begins with providing one of the plastic coated metal layers with a cavity, sometimes called a "butter dish" shape. The battery cell components are disposed inside the cavity of the plastic coated metal layer. The other of the plastic coated metal layers is then placed on top of the battery cell components and fused at the periphery to the one of the plastic coated metal layers with the cavity, for example, by heat sealing around the edges. The battery cell for incorporation in a battery pack assembly is thereby provided.

Battery cells such as lithium-ion battery cells are known to generate heat during operation and as a result of a charge cycle when recharging. When overheated or otherwise exposed to high-temperature environments, undesirable effects can impact the operation of lithium-ion batteries. Cooling systems are typically employed with lithium-ion battery packs to militate against the undesirable overheating conditions. The cooling systems may include cooling plates or fins sandwiched between individual battery cells within the battery pack. The cooling system may have channels through which a coolant flows in a heat transfer relationship with the battery cells. Nonlimiting examples of known cooling systems for battery cells are described in Assignee's co-pending U.S. patent application Ser. No. 12/713,729 to Essinger et al. and U.S. patent application Ser. No. 12/842,478 to Kumar et al., the entire disclosures of which are hereby incorporated herein by reference.

Conventional cooling systems have included air to air cooling, cooling plates or fins sandwiched between individual battery cells within the battery pack along with heat sinks in the same location.

There is a continuing need for a battery cooling system and a method for making the battery cooling system that maximizes efficient heating and cooling of the battery cells with minimum delta temperatures. Desirably, the battery cooling system and method maintains uniform surface temperatures over the battery cells and efficiently transfers heat away from the cells using open bath cooling in a hybrid vehicle.

SUMMARY OF THE INVENTION

In concordance with the instant disclosure, a battery cooling system and method of cooling a battery pack is surprisingly discovered. In a first embodiment, a vehicle battery pack with a self-contained liquid cooling system comprises a sealed container having an interior space; a battery assembly disposed within the interior space of the container, the battery assembly including a plurality of battery cells having at least one fluid channel formed therebetween; a dielectric fluid disposed within the at least one fluid channel in contact with the battery cells of the battery assembly and configured to heat and cool the battery assembly; a heating element disposed within the interior space configured to heat the dielectric fluid; and a cooling element disposed within the interior space configured to cool the dielectric fluid.

In another embodiment, a Lithium Ion battery cooling system for use in a hybrid vehicle comprises a plurality of self-contained liquid cooling modules, each of the cooling modules further comprises a sealed container having an interior space; a battery assembly disposed within the interior space of the container and including a plurality of battery cells having at least one fluid channel formed therebetween; a dielectric fluid disposed within the at least one fluid channel in contact with the battery cells of the battery assembly and configured to heat and cool the battery assembly; a heating element disposed within the interior space configured to heat the dielectric fluid; and a cooling element disposed within the interior space configured to cool the dielectric fluid.

In a further embodiment, a method of cooling a vehicle battery pack comprises the steps of: providing a sealed container having an interior space; providing a battery assembly within the interior space of the container and including a plurality of battery cells having at least one fluid channel formed therebetween; providing a dielectric fluid within the interior space; immersing at least a portion of the battery assembly with the dielectric fluid; causing the dielectric fluid to flow about the plurality of battery cells throughout the interior space of the container; and cooling the dielectric fluid during operation of the vehicle to maintain a substantially uniform surface temperature over each of the plurality battery cells.

DRAWINGS

The above, as well as other advantages of the present disclosure, will become readily apparent to those skilled in the art from the following detailed description, particularly when considered in the light of the drawings described herein.

Figure 2:
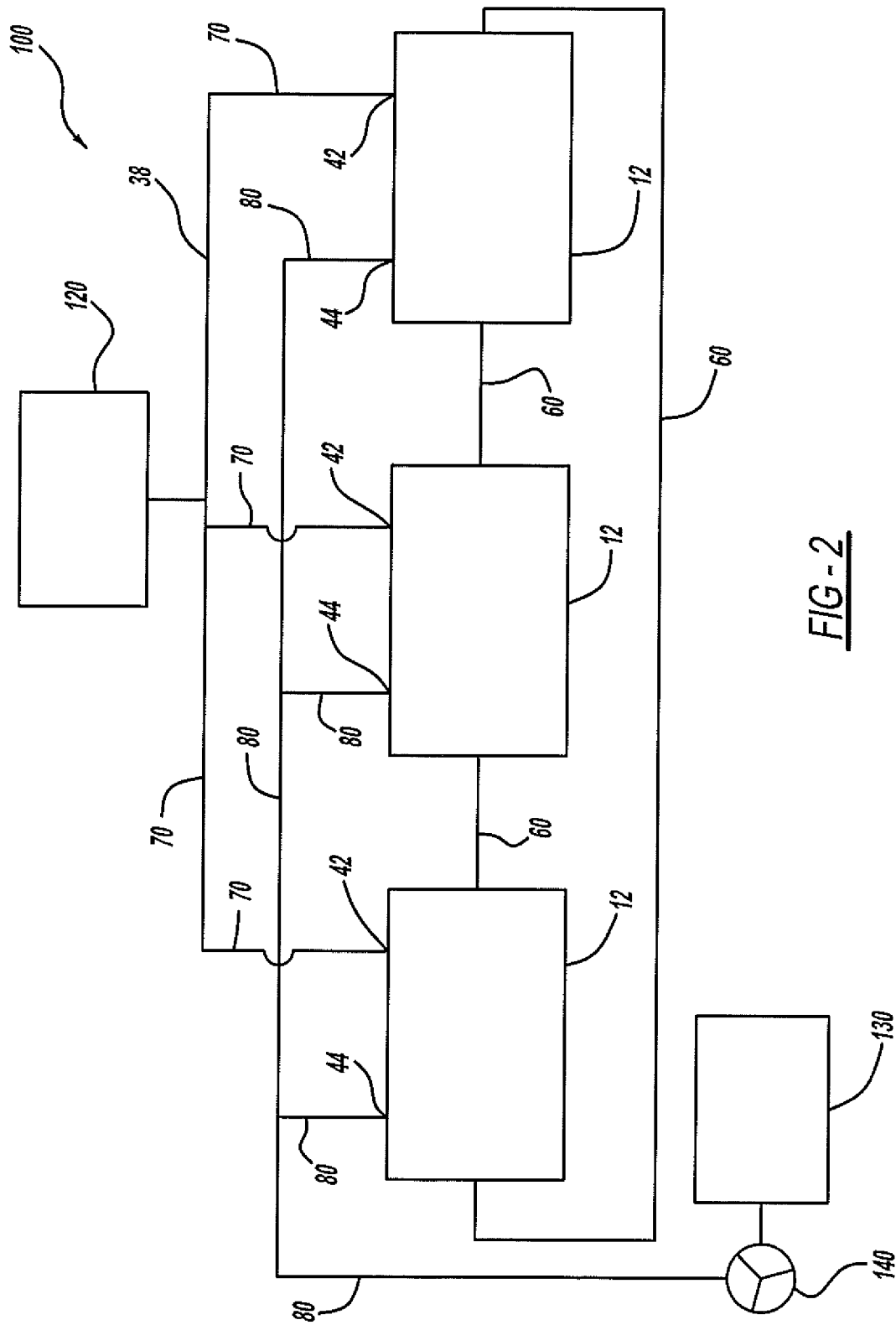

FIG. 1 is a schematic view of the battery cooling system of the present disclosure; and FIG. 2 is a plan view of multiple battery cooling systems of the present invention connected in series.

DETAILED DESCRIPTION OF THE INVENTION

The following detailed description and appended drawing describes and illustrates an embodiment of the invention. The description and the drawing serve to enable one skilled in the art to make and use the invention, and are not intended to limit the scope of the invention in any manner. In respect of the methods disclosed, the steps presented are exemplary in nature, and thus, the order of the steps is not necessary or critical.

With reference to FIG. 1, a vehicle battery pack with a self-contained liquid cooling system 10 of the present disclosure is there shown. The system 10 is a module 12 formed of a container 14 with an interior space 16 for supporting a battery assembly 18. The container 14 is a closed and sealed container 14 for forming a self-contained liquid cooling system 10. In one embodiment, the battery assembly 18 includes a plurality of battery cells 20 such as a plurality of Lithium-ion (Li-ion) batteries for use in a hybrid vehicle. In another embodiment, the plurality of battery cells 20 is Li-ion batteries for use in a Battery Electric Vehicle (BEV). Additional batteries for use with other prime mover vehicles may be provided with the liquid cooling system 10 of the present invention, where each battery cell includes active material for generating power from an electrochemical reaction within the interior space 16 of the container 14. The battery cells 20 are preferably stacked to form a battery cell stack 22. In the embodiment shown, a gap 24 between each battery cell 20 is between 0.25-0.50 mm, forming a fluid channel 26 between each battery cell 20. In another embodiment, the gap 24 may be less than 0.25 mm. It is understood that other gap sizes can be used as desired.

A dielectric coolant 28 is disposed within the interior space 16 of the container 14 and the fluid level shown is such that the battery assembly 18 is completely immersed within the dielectric coolant 28. The dielectric coolant 28 is in contact with the battery cells 20 through the fluid channels 26 formed by gaps 24. In one embodiment, the dielectric coolant 28 may be halogenated. In another embodiment, the dielectric coolant 28 may be conditioned to have a boiling point at or near a desired operating temperature of the battery cells 20.

A heating element 34 is located at a base area 36 of the container 14. The heating element 34 shown is an electronic heating element. It is understood that other heating element types may be used. The heating element 34 is shown as a single element; however, multiple heating elements 34 such as heating plates may be provided.

A cooling element 38 is located at an upper area 40 of the container 14. The cooling element 38 may be a chilled water condenser having an inlet 42 and an outlet 44 extending beyond the walls of the sealed container 14 for importing and exporting water for the cooling element 38. In another embodiment, the cooling element 38 may be a chilled water plate. In still another embodiment, the cooling element 38 may be a thin aluminum heat sink having external chilled water travelling through the cooling element 38. The cooling element 38 may be a graphite foil impregnated with an electrically nonconductive polymer. The cooling element may also be formed from copper.

In the embodiment shown, arrows "A" and "B" indicate a flow of the dielectric coolant 28. Upon heating of each battery cell 20 by the heating element 34, the dielectric coolant 28 exposed to a front surface area 30 and a rear surface area 32 of the battery cells 20, will boil. The heated dielectric coolant 28 will rise and flow to the top of the battery cell stack 22 to be cooled by the cooling element 38. The cooled dielectric coolant 28 will return to the base area 36, generally following either coolant paths "A" or "B." Where the general location of the dielectric coolant 28 at the moment of boiling is located within the fluid channels 26 of the battery cells 20 in the center area and toward a side 50 of the container 14, the dielectric coolant 28 will tend to follow flow path "A". Similarly, if the general location of the dielectric coolant 28 at the moment of boiling is located within the fluid channels 26 of the battery cells 20 in the center area and toward an opposing side 52 of the container 14, the dielectric coolant 28 will tend to follow flow path "B".

A coolant temperature sensor 46 is located on or near the cooling element 38. In the embodiment shown, the temperature sensor 46 is located within the area of the outlet 44 of the cooling element 38 and measures a temperature of the dielectric coolant 28 at a point of exposure to the cooling element. The temperature sensor 46 may be located anywhere within the battery cell stack 22 as desired.

A coolant level sensor 48 is also provided and is located near the upper area 40 of the container 14 to measure the fluid level of the dielectric coolant 28 within the container 14, ensuring complete immersion of the battery assembly 18 within the dielectric coolant 28.

FIG. 2 illustrates a plurality of self-contained liquid cooling modules 12 connected in series via a conduit 60 and forming a cooling system 100 for use in a hybrid vehicle or BEV. In one embodiment, the inlet 42 of the cooling element 38 for each module 12 is in fluid communication with the vehicle's air conditioning (A/C) system 120 by a conduit 70. In turn, the heat generated from each cooling module 12 may be expelled through the outlet 44 to the coolant 130 by a conduit 80. The coolant 130 provides an external heat exchange with the vehicle, where the vehicle is a hybrid vehicle. Alternatively, the heat generated from each cooling module 12 may be expelled through the outlet 44 and the conduit 80 to the coolant 130, such as an electronic cooling loop, where the prime mover is a BEV, typically through a valve, such as a 3-way valve 140.

The present disclosure further includes a method of cooling a vehicle battery pack. The method includes the steps of providing a closed and sealed container 14. The container 14 has an interior space 16. A battery assembly 18 is disposed within the interior space 16 of the container 14. The battery assembly 18 includes a plurality of battery cells 20 having fluid channels 26 formed between the stacked cells 20. The stacked cells 20 maintain a gap 24 between battery cells 20 of no greater than 0.50 mm and no less than 0.25 mm in one embodiment. In another embodiment, the gap 24 may be less than 0.25 mm. Each gap 24 forms the fluid channel 26 between adjacent battery cells 20. A dielectric coolant 28 is disposed within the interior space 16 of the container 14. The battery assembly 18 typically is fully immersed within the dielectric coolant 28 and the dielectric coolant 28 is received within the fluid channels 26, completely contacting each of the battery cells 20. By filling the gap 24 with the dielectric coolant 28, both heating and cooling can be accomplished.

During start up of a vehicle, a heating element 34 located along the base area 36 of the container 14 may heat the dielectric fluid 28 to boiling. In one embodiment, the dielectric fluid 28 may be conditioned to have a boiling point at or near the desired operating temperature of the battery cells 20. Vapors rise between the fluid channels 26, heating the battery cells 20 to the operating temperature. Condensation heating ensures efficient and uniform temperature heat transfer without overshoot of the battery cell 20 temperatures. When the battery cells 20 are operating, the dielectric coolant 28 boils on the surfaces of the battery cell 20, keeping temperatures of the surfaces uniform and transferring heat efficiently to the cooling element 38. The heated coolant 28 rises, traveling through the fluid channels 26 from the base area 36 of the container 14 to the upper area 40, fully flowing across each battery cell 20 throughout the interior space 16 of the container 14 as illustrated by arrows "A" and "B". The cooled dielectric coolant 28 will return to the base area 36, generally following either coolant paths "A" or "B." Where the general location of the dielectric coolant 28 at the moment of boiling is located within the fluid channels 26 of the battery cells 20 in the center area and toward a side 50 of the battery cell stack 22, the dielectric coolant 28 will tend to follow flow path "A". Similarly, if the general location of the dielectric coolant 28 at the moment of boiling is located within the fluid channels 26 of the battery cells 20 in the center area and toward an opposing side 52 of the battery cell stack 22, the dielectric coolant 28 will tend to follow flow path "B". During operation, the coolant 28 flowing along the fluid channels 26 provides a substantially uniform surface temperature over each of the plurality of battery cells 20 while transferring heat away from each of the battery cells 20 by the flowing dielectric coolant 28.

The step of condensing the vapors includes the use of the cooling element 38, such as a chilled water plate, placed above the battery cells 20 in the upper area 40 of the container 14. Multiple battery cells 20 form multiple modules 12. The modules 12 are connected in series. The heated vapors rise to the upper area 40 of the container and are cooled by the cooling element 38. The water within the cooling element 38 is chilled by an existing air conditioning system chiller of the vehicle and circulated from the inlet 42 to the outlet 44 of the cooling element 38. A coolant temperature sensor 46 measures the dielectric coolant 28 temperature at the outlet 44 of the cooling element 38. A coolant level sensor 48 measures the level of the dielectric coolant 28 within the container 14.

While certain representative embodiments and details have been shown for purposes of illustrating the invention, it will be apparent to those skilled in the art that various changes may be made without departing from the scope of the disclosure, which is further described in the following appended claims.

What is claimed is:

1. A vehicle battery pack with a self-contained liquid cooling system comprising:
    a sealed container having an interior space;
    a battery assembly disposed within the interior space of the container, the battery assembly including a plurality of battery cells having at least one fluid channel formed therebetween;
    a dielectric fluid disposed within the at least one fluid channel in contact with the battery cells of the battery assembly and configured to heat and cool the battery assembly;
    a heating element disposed within the interior space configured to heat the dielectric fluid; and
    a cooling element disposed within the interior space configured to cool the dielectric fluid.

2. The vehicle battery pack of claim 1, wherein the at least one fluid channel is configured to direct the dielectric fluid through the plurality of battery cells in the interior space of the container.

3. The vehicle battery pack of claim 1, wherein the battery cells of the battery assembly are completely immersed in the dielectric fluid.

4. The vehicle battery pack of claim 1, wherein the dielectric fluid is configured to have a desired boiling point.

5. The vehicle battery pack of claim 1, wherein the cooling element is one of a metal plate and a graphite foil impregnated with an electrically nonconductive polymer.

6. The vehicle battery pack of claim 1, wherein the cooling element is formed from one of copper and aluminum.

7. The vehicle battery pack of claim 1, wherein the cooling element is disposed above the battery cells.

8. The vehicle battery pack of claim 1, wherein the heating element is disposed below the battery cells.

9. The vehicle battery pack of claim 1, further comprising at least one of a dielectric fluid temperature sensor and a dielectric fluid level sensor disposed within the container.

10. A Lithium Ion battery cooling system for use in a hybrid vehicle comprising:
    a plurality of self-contained liquid cooling modules, each of the cooling modules further comprising:
        a sealed container having an interior space;
        a battery assembly disposed within the interior space of the container and including a plurality of battery cells having at least one fluid channel formed therebetween;
        a dielectric fluid disposed within the at least one fluid channel in contact with the battery cells of the battery assembly and configured to heat and cool the battery assembly;
        a heating element disposed within the interior space configured to heat the dielectric fluid; and
        a cooling element disposed within the interior space configured to cool the dielectric fluid.

11. The Lithium Ion battery cooling system of claim 10, wherein the at least one fluid channel is configured to direct the dielectric fluid through the plurality of battery cells in the interior space of the container.

12. The Lithium Ion battery cooling system of claim 10, wherein the battery cells of the battery assembly are completely immersed in the dielectric fluid.

13. The Lithium Ion battery cooling system of claim 10, wherein the dielectric fluid is configured to have a desired boiling point.

14. The Lithium Ion battery cooling system of claim 10, wherein the cooling element is one of a metal plate and a graphite foil impregnated with an electrically nonconductive polymer.

15. The Lithium Ion battery cooling system of claim 10, wherein the cooling element is formed from one of copper and aluminum.

16. The Lithium Ion battery cooling system of claim 10, wherein the cooling element is disposed above the battery cells.

17. The Lithium Ion battery cooling system of claim 10, wherein the heating element is disposed below the battery cells.

18. The Lithium Ion battery cooling system of claim 10, further comprising at least one of a dielectric fluid temperature sensor and a dielectric fluid level sensor disposed within the container.

19. A method of cooling a vehicle battery pack comprising the steps of:
    providing a sealed container having an interior space;
    providing a battery assembly within the interior space of the container and including a plurality of battery cells having at least one fluid channel formed therebetween;
    providing a dielectric fluid within the interior space;
    immersing at least a portion of the battery assembly with the dielectric fluid;
    causing the dielectric fluid to flow about the plurality of battery cells throughout the interior space of the container;
    heating the dielectric fluid during start up of the vehicle to heat the plurality of battery cells, wherein a heating element disposed within the interior space of the sealed container is used to cool the dielectric fluid; and
    cooling the dielectric fluid during operation of the vehicle to maintain
        a substantially uniform surface temperature over each of the plurality battery cells, wherein a cooling element disposed within the interior space of the sealed container is used to cool the dielectric fluid.

20. The method of cooling a vehicle battery pack of claim 19, wherein the battery cells of the battery assembly are completely immersed in the dielectric fluid.

* * * * *